(12) United States Patent
Chuang

(10) Patent No.: US 6,908,090 B2
(45) Date of Patent: Jun. 21, 2005

(54) CAMBERING VEHICLE HAVING INCLINED PIVOT AXLE

(75) Inventor: Jin Chen Chuang, Taichung (TW)

(73) Assignee: Unique Forces Company Limited, Tortola (VG)

( * ) Notice: Subject to any disclaimer, the term of this patent is extended or adjusted under 35 U.S.C. 154(b) by 0 days.

(21) Appl. No.: 10/608,399

(22) Filed: Jun. 23, 2003

(65) Prior Publication Data

US 2004/0256822 A1 Dec. 23, 2004

(51) Int. Cl.⁷ .................................................. B62M 1/12
(52) U.S. Cl. .............................. 280/87.041; 280/87.05; 280/62
(58) Field of Search .................... 280/87.01, 87.021, 280/87.041, 87.042, 87.05, 38, 62

(56) References Cited

U.S. PATENT DOCUMENTS

| | | | |
|---|---|---|---|
| 1,303,127 A | | 5/1919 | Wickman |
| 1,336,100 A | | 4/1920 | Shearer |
| 1,617,357 A | * | 2/1927 | Walter ........................ 280/221 |
| 1,664,858 A | | 4/1928 | Headley |
| 2,613,083 A | * | 10/1952 | Moludy ........................ 280/42 |
| 4,045,048 A | | 8/1977 | Irwin |
| 4,047,732 A | | 9/1977 | Williams et al. |
| 4,050,711 A | | 9/1977 | Denzer |
| 4,050,712 A | | 9/1977 | Denzer et al. |
| 4,050,713 A | | 9/1977 | Williams |
| 4,054,300 A | | 10/1977 | Winchell |
| 4,065,146 A | | 12/1977 | Denzer |
| 4,071,261 A | | 1/1978 | Winchell |
| 4,076,270 A | | 2/1978 | Winchell |
| 4,087,104 A | | 5/1978 | Winchell et al. |
| 4,087,106 A | | 5/1978 | Winchell |
| 4,087,107 A | | 5/1978 | Winchell |
| 4,087,108 A | | 5/1978 | Winchell |
| 4,088,338 A | | 5/1978 | Winchell et al. |
| 4,123,079 A | | 10/1978 | Biskup |
| 4,133,551 A | | 1/1979 | Biskup |
| 4,165,093 A | | 8/1979 | Biskup |
| 4,325,565 A | | 4/1982 | Winchell |
| 4,526,390 A | | 7/1985 | Skolnik |
| 4,540,192 A | | 9/1985 | Shelton |
| RE32,031 E | | 11/1985 | Winchell |
| 4,776,604 A | | 10/1988 | Valdez et al. |
| 5,039,121 A | | 8/1991 | Holter |
| 5,547,204 A | | 8/1996 | Gamzo |
| 5,785,331 A | | 7/1998 | Rappaport |

(Continued)

FOREIGN PATENT DOCUMENTS

| | | | |
|---|---|---|---|
| CA | 2390224 A1 | 5/2001 | |
| WO | WO/92/00217 A1 | * 1/1992 | ............ 280/87.041 |
| WO | WO 01/32470 A3 | 5/2001 | |
| WO | WO 01/32470 A2 | 5/2001 | |

OTHER PUBLICATIONS

Don Sherman, *Camber Jamboree*, Car and Driver Magazine, Jan. 1981, pp. 53–61, USA.

*Primary Examiner*—Lesley D. Morris
*Assistant Examiner*—Jeff Restifo
(74) *Attorney, Agent, or Firm*—Lerner, David, Littenberg, Krumholz & Mentlik, LLP

(57) ABSTRACT

A cambering vehicle includes a front column, and a left and a right trailing arm having a front portion pivotally attached to the front column with a pivot axle and having a rear wheel and having a foot pedal to support users. The pivot axles are inclined relative to the front column, to change the moving stroke of the trailing arms. Each of the front portions of the trailing arms includes a bushing rotatably attached onto the pivot axles respectively, and the pivot axles may be secured to the front column. A link may couple the trailing arms together.

10 Claims, 5 Drawing Sheets

U.S. PATENT DOCUMENTS

| | | |
|---|---|---|
| 6,220,612 B1 | 4/2001 | Beleski, Jr. |
| 6,318,741 B1 | 11/2001 | Chen |
| 6,378,879 B2 * | 4/2002 | Rappaport ............. 280/87.041 |
| 6,467,781 B1 | 10/2002 | Feng |
| 6,467,986 B2 | 10/2002 | Feng ........................... 403/93 |
| 6,485,039 B1 * | 11/2002 | Ming-Fu ................ 280/87.041 |
| 6,499,751 B1 | 12/2002 | Beleski, Jr. |
| 6,517,093 B2 * | 2/2003 | Feng ..................... 280/87.042 |
| 6,554,302 B1 | 4/2003 | Liu |
| 6,719,310 B1 * | 4/2004 | Lin ....................... 280/87.041 |
| 2001/0003392 A1 | 6/2001 | Rappaport |
| 2002/0050695 A1 | 5/2002 | Feng |
| 2002/0053775 A1 * | 5/2002 | Feng ..................... 280/87.041 |
| 2002/0063406 A1 | 5/2002 | Feng |
| 2002/0063411 A1 | 5/2002 | Feng |
| 2002/0064417 A1 | 5/2002 | Feng |
| 2002/0070519 A1 | 6/2002 | Rappaport |
| 2003/0006569 A1 | 1/2003 | Combs |
| 2003/0090076 A1 | 5/2003 | Beleski, Jr. |
| 2004/0032105 A1 * | 2/2004 | Tsai ..................... 280/87.041 |

* cited by examiner

CAMBERING VEHICLE HAVING INCLINED PIVOT AXLE

BACKGROUND OF THE INVENTION

1. Field of the Invention

The present invention relates to a cambering vehicle, and more particularly to a cambering vehicle having a left and a right trailing arm rotatably or pivotally attached to a front column with inclined axles.

2. Description of the Prior Art

Various kinds of typical cambering vehicles have been developed and are operator propelled three wheeled vehicle, and comprise a front column having a steering shaft rotatably attached thereto, a front wheel attached to bottom of the steering shaft, and a pair of laterally spaced rear wheels on trailing arms which are articulated to the front column.

As the vehicle travels a sinusoidal path, the operator shifts his or her weight to the inside of each turning arc, to shift the center of mass to the inside of each arc, and to result a series of accelerations due to the conservation of momentum of the vehicle and operator, and thus to attain a forward motion.

For example, U.S. Pat. No. 4,123,079 to Biskup, U.S. Pat. No. 4,133,551 to Biskup, U.S. Pat. No. 6,220,612 to Beleski, Jr., U.S. Pat. No. 6,467,986 to Feng, and U.S. Pat. No. 6,517,093 to Feng, disclose five examples of the typical cambering vehicles.

However, the trailing arms have the front ends rotatably or pivotally secured to the front column with an attachment fitting or shaft that is perpendicular to the front column. When the vehicle is moved toward one side, such as the right side, the left trailing arm and thus the left rear wheel may be forced or caused to be moved upwardly away from the ground, or may not be suitably contacted with the ground.

One the contrary, when the vehicle is moved toward the other side or the left side, the right trailing arm and thus the right rear wheel may also be forced or caused to be moved upwardly away from the ground, or may not be suitably contacted with the ground, such that the vehicle may not be stably travels along the sinusoidal path.

The present invention has arisen to mitigate and/or obviate the afore-described disadvantages of the conventional cambering vehicles.

SUMMARY OF THE INVENTION

The primary objective of the present invention is to provide a cambering vehicle including a left and a right trailing arm rotatably or pivotally attached to a front column with inclined axles, to allow the trailing arms and the rear wheels to be moved without being moved upwardly away from the ground.

The other objective of the present invention is to provide a cambering vehicle including a left and a right trailing arm rotatably or pivotally attached to a front column with inclined axles, to change moving stroke of the vehicle.

In accordance with one aspect of the invention, there is provided a cambering vehicle comprising a front column, a left trailing arm including a front portion pivotally attached to the front column with a first pivot axle, and including a rear portion having a rear wheel attached thereto, and including a foot pedal disposed thereon to support users, and a right trailing arm including a front portion pivotally attached to the front column with a second pivot axle, and including a rear portion having a rear wheel attached thereto, and including a foot pedal disposed thereon to support users. The first pivot axle and the second pivot axle are inclined relative to the front column.

Each of the front portions of the left and the right trailing arms includes a bushing attached thereto and rotatably attached onto the first and the second pivot axles respectively. The first and the second pivot axles are secured to the front column respectively, for example.

The front column includes a front tube, a steering shaft rotatably disposed concentrically within the front tube, a front wheel provided on bottom of the steering shaft, and a handle provided on top of the steering shaft. The steering shaft includes a stem adjustably disposed thereon to adjustably support the handle on the steering shaft.

A braking device may further be provided and used for braking either or both of the rear wheels.

A coupling device may further be provided and used for coupling the left and the right trailing arms together. For example, The coupling device may include a link pivotally coupled between the left and the right trailing arms.

The link includes a first end pivotally secured to one of the left and the right trailing arms with a pivot pin, and a second end pivotally secured to the other of the left and the right trailing arms with a latch pin. Each of the left and the right trailing arms includes at least one ear provided thereon, and the link includes two ends pivotally secured to the ears of the left and the right trailing arms with pins.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
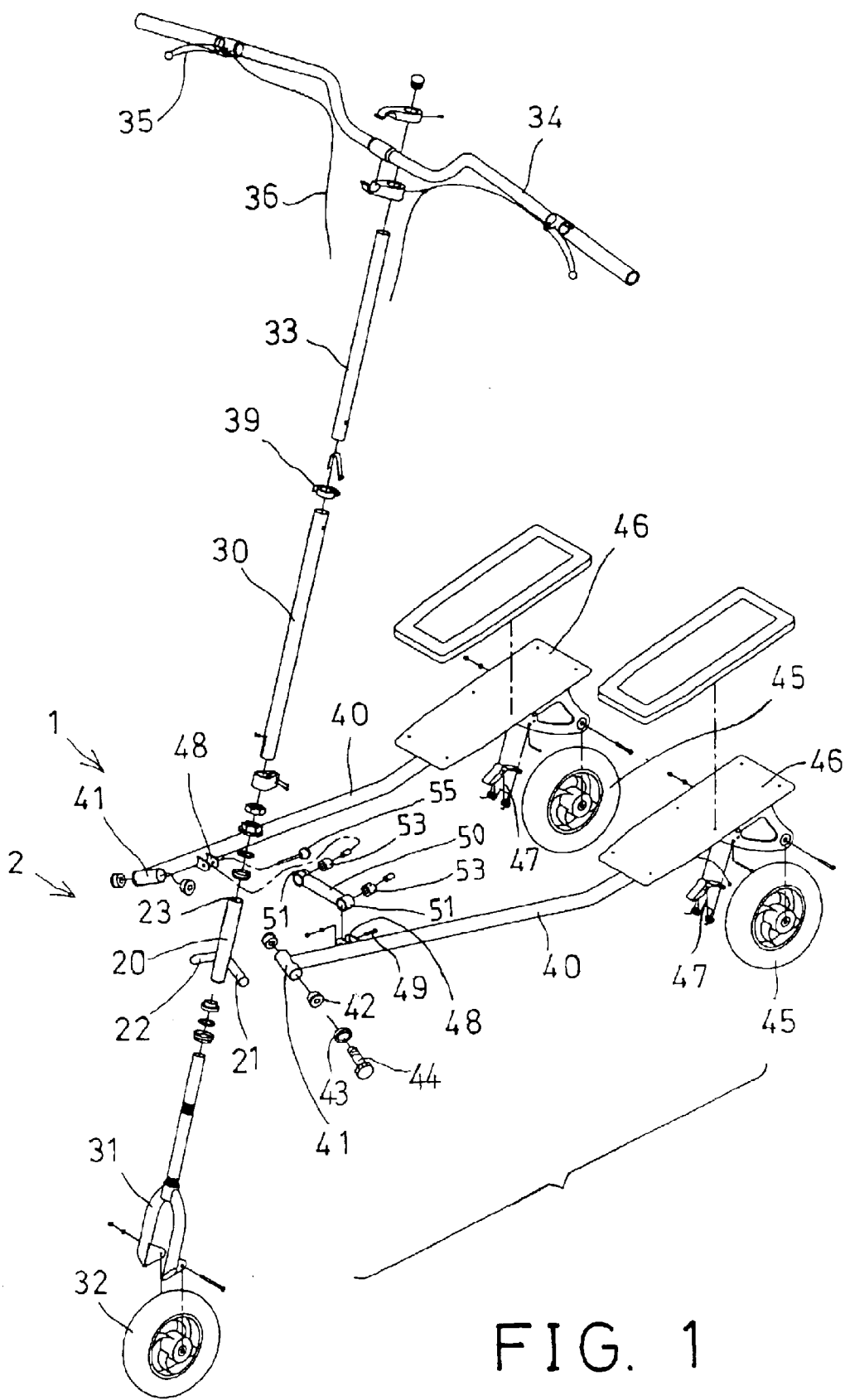
FIG. 1 is an exploded view of a cambering vehicle in accordance with the present invention.
Figure 2:
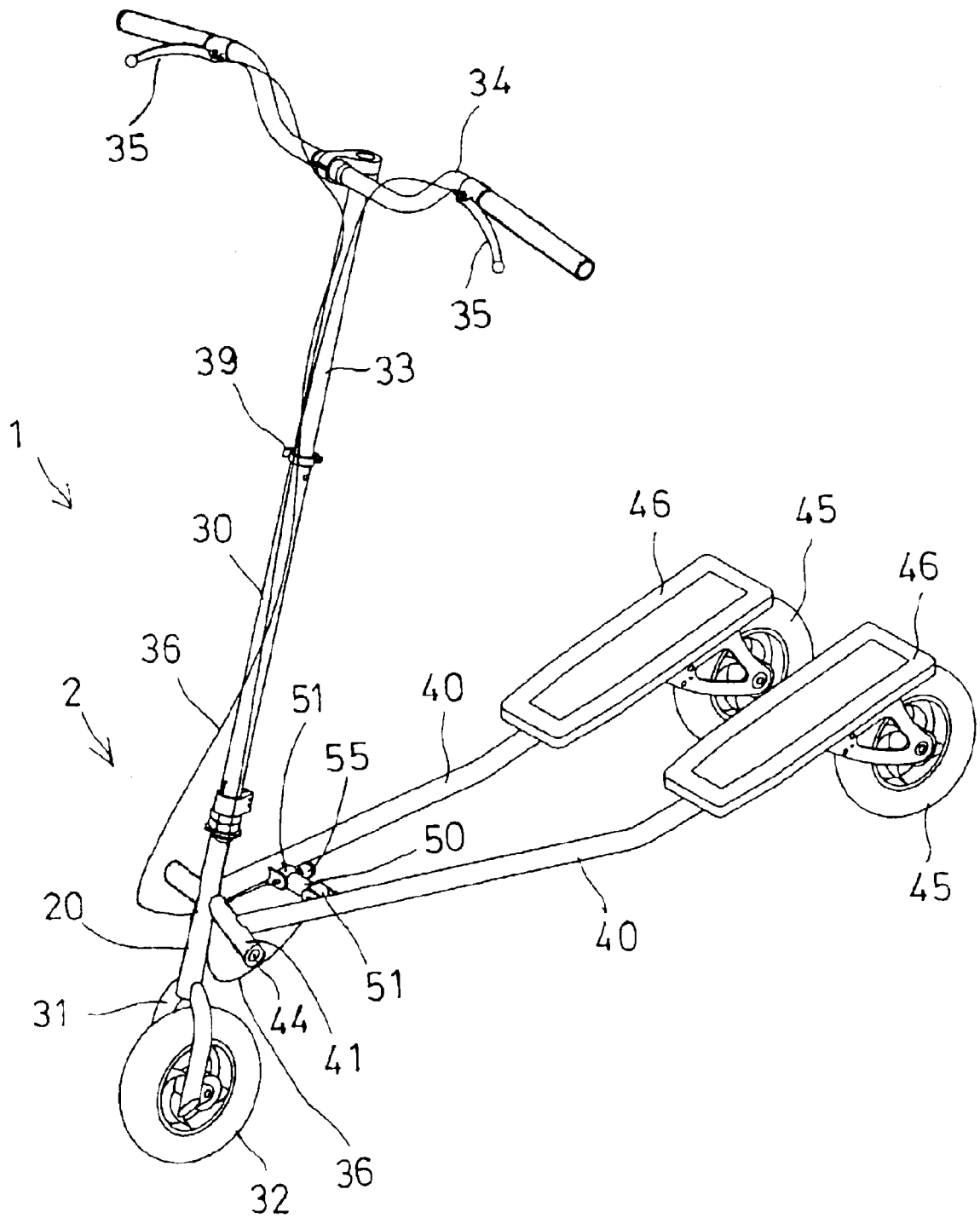
FIG. 2 is a perspective view of the cambering vehicle.
Figure 3:
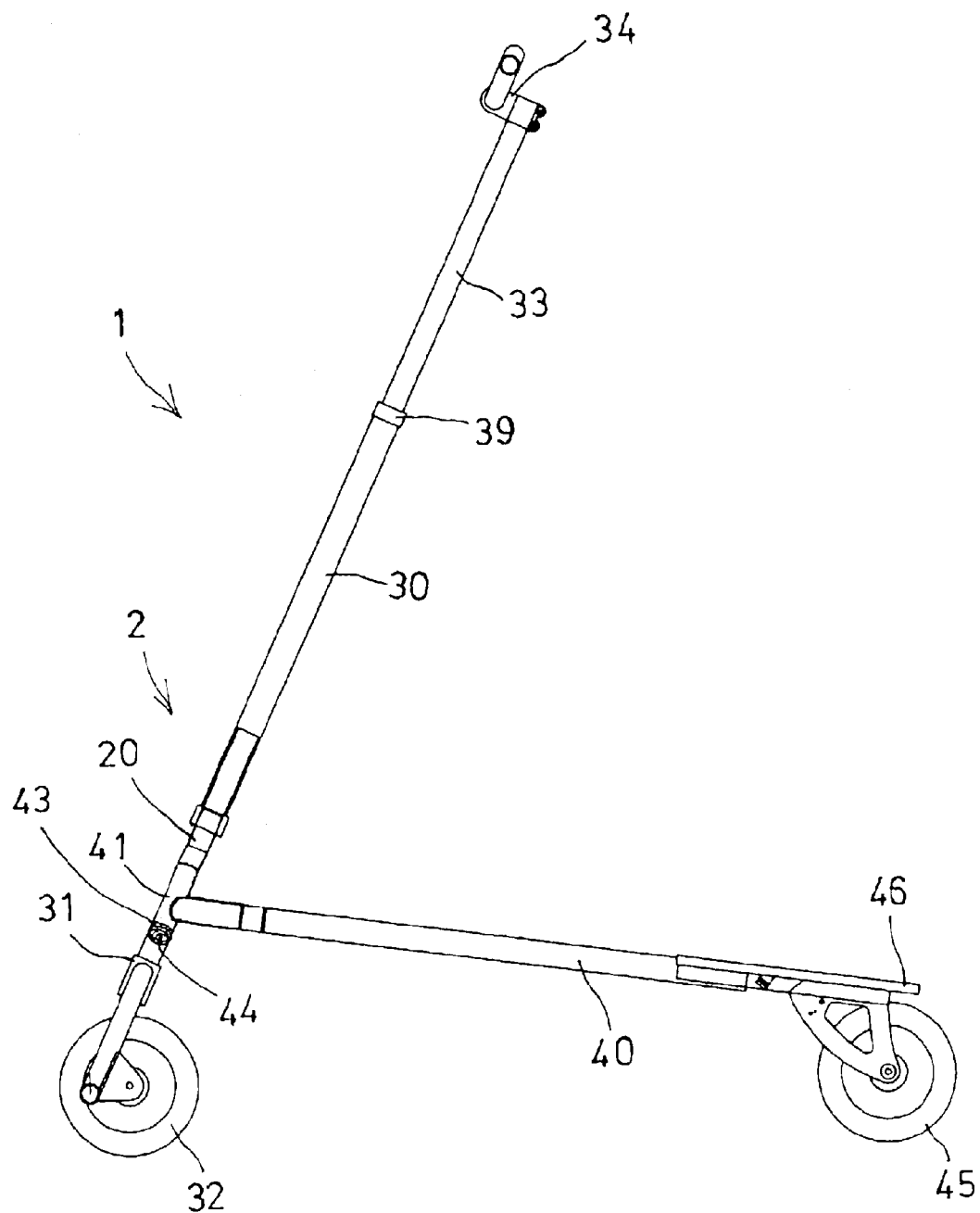
FIG. 3 is a side view of the cambering vehicle.
Figure 5:
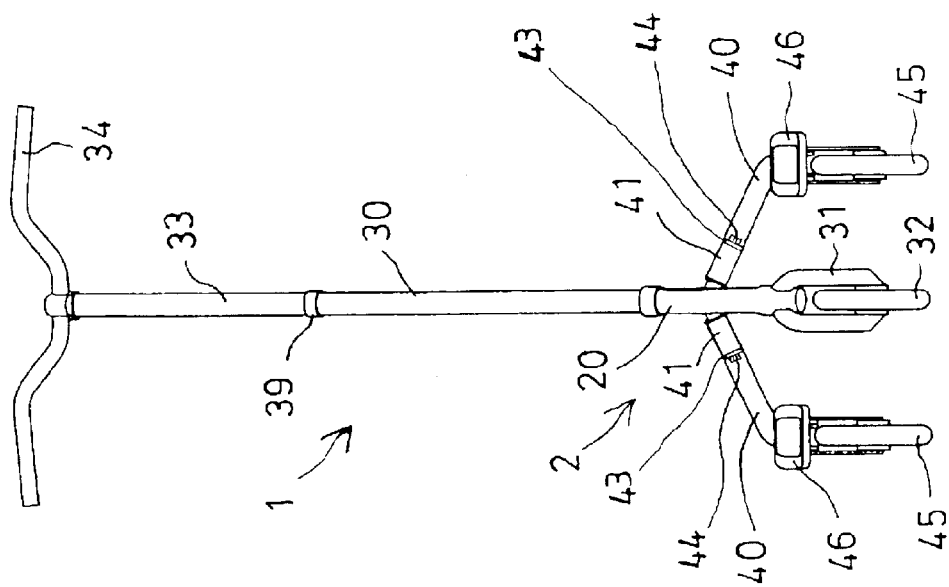
FIG. 5 is a front view of the cambering vehicle.
Figure 4:
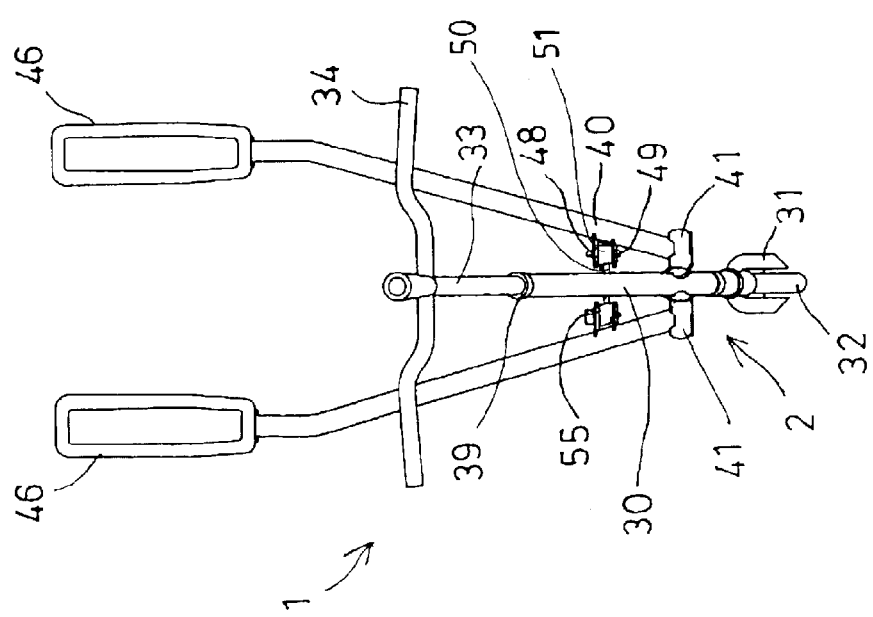
FIG. 4 is a top view of the cambering vehicle.

Referring to the drawings, and initially to FIGS. 1–5, a cambering vehicle 1 in accordance with the present invention comprises a front column 2 including a front tube 20, a steering shaft 30 rotatably engaged or disposed concentrically within the front tube 20, a front fork 31 attached to bottom of the steering shaft 30 to support a front wheel 32, and a handle 34 supported on top of the steering shaft 30.

The steering shaft 30 may further include a stem 33 retractably received therein and extendible outwardly therefrom, or adjustably secured to the steering shaft 30 with such as a quick release clamp 39. The handle 34 is secured on top of the steering shaft 30 or on top of the stem 33 of the steering shaft 30. One or more, such as two brake hand grips 35 are attached to the handle 34 for braking purposes, and are coupled to cables 36 respectively.

Figure 7:
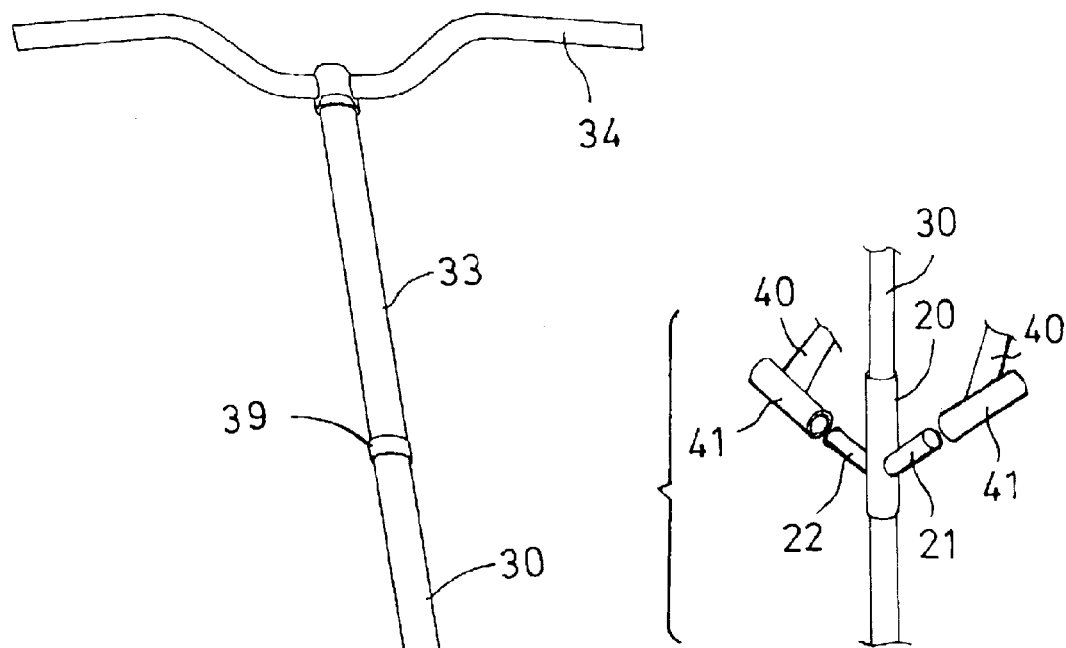
FIG. 7 is a partial exploded view illustrating the other arrangement of the front column of the cambering vehicle.
Figure 6:
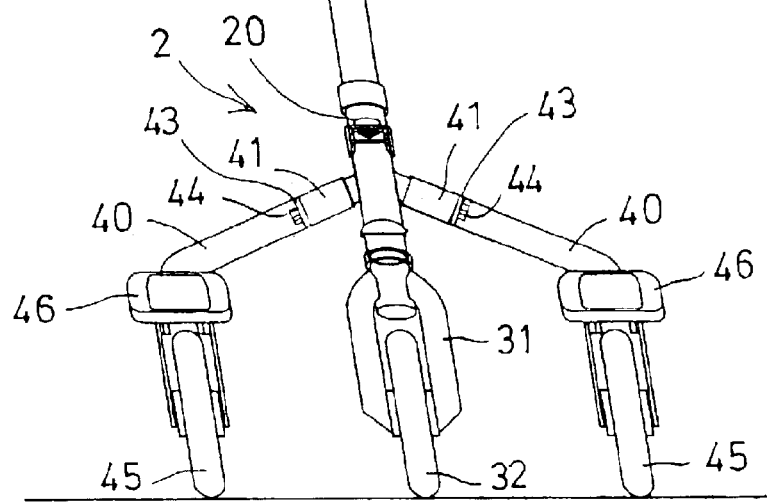
FIG. 6 is a schematic view illustrating the operation of the cambering vehicle.

The front column 2 includes two pivot axles 21, 22 extended from the front tube 20, and inclined relative to the front tube 20. For example, as shown in FIG. 1, the pivot axles 21, 22 are illustrated to be extended inclinedly and downwardly relative to the front tube 20. However, alternatively, as shown in FIG. 7, the pivot axles 21, 22 may also be extended inclinedly and upwardly relative to the front tube 20.

A left trailing arm and a right trailing arm 40 each include a front portion rotatably or pivotally attached to the front tube 20 of the front column 2 with the pivot axles 21, 22 respectively. For example, each of the trailing arms 40 includes a bushing 41 attached or provided on the front portion thereof, and rotatably attached onto the pivot axles 21, 22 respectively, for rotatably or pivotally coupling the trailing arms 40 to the front tube 20 of the front column 2.

The front portions or the bushings 41 of the trailing arms 40 may be rotatably attached to the pivot axles 21, 22 respectively with bearings 42, washers 43, gaskets or the like, and secured to the pivot axles 21, 22 with fasteners 44 respectively, in order to solidly or stably couple the trailing arms 40 to the front tube 20 of the front column 2. Each of the trailing arms 40 includes a rear wheel 45 rotatably attached to the rear end, a foot pedal 46 disposed thereon to support users.

The cambering vehicle 1 may further include two brake devices 47 attached to the rear portions of the trailing arms 40 respectively, for braking the rear wheels 45 respectively. The brake hand grips 35 are coupled to the brake devices 47 with the cables 36 respectively, in order to actuate the brake devices 47 to brake the rear wheels 45.

It is to be noted that the pivot axles 21, 22 are illustrated or shown to be secured to or extended from the front tube 20 of the front column 2 respectively. However, the pivot axles 21, 22 may also be provided on the front portions of the trailing arms 40, and rotatably or pivotally attached to the front tube 20 of the front column 2 respectively with such as bushings (not shown) or the like that may be secured or extended inclinedly from the front tube 20 of the front column 2.

Each of the trailing arms 40 includes one or more ears 48 secured thereto or extended therefrom, and the ears 48 of the trailing arms 40 are facing toward each other. A cable or a link 50 includes two ends 51 to be pivotally or rotatably secured to the ears 48 of the trailing arms 40 with gaskets or bearings 53 or the like. One end 51 of the link 50 may be rotatably attached to the ears 48 of one of the trailing arms 40 with a pivot pin 49, and the other end 51 of the link 50 may be rotatably and detachably coupled to the ears 48 of the other trailing arm 40 with a fastener (not shown), a latch pin 55 or the like.

In operation, when the vehicle travels a sinusoidal path, and when the operator shifts his or her weight to the inside of each turning arc, to shift the center of mass to the inside of each arc, the front column 2 may thus be tilted relative to the ground, to result a series of accelerations due to the conservation of momentum of the vehicle and operator, and thus to attain a forward motion.

The inclination of the pivot axles 21, 22 relative to the front tube 20 of the front column 2 respectively may cause or generate different moving stroke of the vehicle as compared with those of the typical cambering vehicles which include a pair of trailing arms having front ends rotatably secured to the front column with an attachment fitting or shaft that is perpendicular to the front column.

The inclination of the pivot axles 21, 22 relative to the front tube 20 of the front column 2 respectively may also be changed or selected to cause different moving stroke of the vehicle, and thus to change the accelerations of the vehicle. It is preferable, but not necessarily, that the pivot axles 21, 22 are arranged symmetric relative to the front column 2.

Accordingly, the cambering vehicle includes a left and a right trailing arm rotatably or pivotally attached to a front column with inclined axles, to allow the trailing arms and the rear wheels to be moved without being moved upwardly away from the ground, and to change the moving stroke of the vehicle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cambering vehicle comprising:

a front column, a left trailing arm including a front portion pivotally attached to said front column with a first pivot axle, and including a rear portion having a rear wheel attached thereto, and including a foot pedal disposed thereon to support users, a right trailing arm including a front portion pivotally attached to said front column with a second pivot axle, and including a rear portion having a rear wheel attached thereto, and including a foot pedal disposed thereon to support users, wherein said first pivot axle and said second pivot axle are inclined relative to said front column, said inclines being either both upward or both downward.

2. The cambering vehicle as claimed in claim 1, wherein each of said front portions of said left and said right trailing arms includes a bushing attached thereto and rotatably attached onto said first and said second pivot axles respectively.

3. The cambering vehicle as claimed in claim 1, wherein said first and said second pivot axles are secured to said front column respectively.

4. The cambering vehicle as claimed in claim 1, wherein said front column includes a front tube, a steering shaft rotatably disposed concentrically within said front tube, a front wheel provided on bottom of said steering shaft, and a handle provided on top of said steering shaft.

5. The cambering vehicle as claimed in claim 4, wherein said steering shaft includes a stem adjustably disposed thereon to adjustably support said handle on said steering shaft.

6. The cambering vehicle as claimed in claim 1 further comprising means for braking said rear wheels.

7. The cambering vehicle as claimed in claim 1 further comprising means for coupling said left and said right trailing arms together.

8. The cambering vehicle as claimed in claim 7, wherein said coupling means includes a link pivotally coupled between said left and said right trailing arms.

9. The cambering vehicle as claimed in claim 8, wherein said link includes a first end pivotally secured to one of said left and said right trailing arms with a pivot pin, and a second end pivotally secured to the other of said left and said right trailing arms with a latch pin.

10. The cambering vehicle as claimed in claim 8, wherein each of said left and said right trailing arms includes at least one ear provided thereon, and said link includes two ends pivotally secured to said at least one ear of said left and said right trailing arms with pins.

* * * * *